United States Patent
Phan (10) Patent No.: US 12,336,499 B1
(45) Date of Patent: Jun. 24, 2025

(54) CONVERTIBLE BED

(71) Applicant: Patricia Phan, Thornton, CO (US)

(72) Inventor: Patricia Phan, Thornton, CO (US)

(*) Notice: Subject to any disclaimer, the term of this patent is extended or adjusted under 35 U.S.C. 154(b) by 85 days.

(21) Appl. No.: 17/506,330

(22) Filed: Oct. 20, 2021

(51) Int. Cl.
*A01K 1/035* (2006.01)

(52) U.S. Cl.
CPC ............................. *A01K 1/0353* (2013.01)

(58) Field of Classification Search
CPC .... A01K 1/0353; A01K 1/035; A01K 1/0157; A47G 9/0261; A47G 2009/0269; A47G 9/0207
See application file for complete search history.

(56) References Cited

U.S. PATENT DOCUMENTS

| | | | |
|---|---|---|---|
| 4,169,428 A | 10/1979 | Waugh | |
| 5,357,901 A * | 10/1994 | Batts | A01K 1/0353 |
| | | | 119/28.5 |
| 5,749,314 A | 5/1998 | Pelham et al. | |
| D441,146 S | 4/2001 | Passmore | |
| 6,378,456 B1 | 4/2002 | Jerome | |
| 9,247,826 B1 * | 2/2016 | Holbrook | A47C 21/046 |
| 2006/0272581 A1 * | 12/2006 | Dunn | A01K 1/0353 |
| | | | 119/28.5 |
| 2008/0182478 A1 * | 7/2008 | Smoot | A63H 3/003 |
| | | | 446/72 |
| 2010/0043713 A1 * | 2/2010 | West | A01K 1/0353 |
| | | | 119/28.5 |
| 2010/0050341 A1 * | 3/2010 | Tepper | A47G 9/0261 |
| | | | 5/501 |
| 2015/0237824 A1 * | 8/2015 | Cantwell | A01K 1/0353 |
| | | | 119/482 |
| 2016/0021846 A1 | 1/2016 | Bigott | |
| 2016/0135422 A1 * | 5/2016 | MacDowell | A01K 1/0353 |
| | | | 119/28.5 |
| 2017/0224138 A1 * | 8/2017 | Pelz | A47C 7/021 |
| 2018/0255945 A1 * | 9/2018 | Stewart | A47G 9/04 |
| 2019/0166794 A1 * | 6/2019 | Dickey | A47G 9/02 |

(Continued)

FOREIGN PATENT DOCUMENTS

DE      20109075 U1 * 8/2001 ........... A01K 1/0353

OTHER PUBLICATIONS

DE-20109075-U1_Machine Translation (Year: 2001).*

(Continued)

*Primary Examiner* — Morgan T Jordan
*Assistant Examiner* — Sahar Almatrahi
(74) *Attorney, Agent, or Firm* — Crawford Maunu PLLC (57) ABSTRACT

Aspects of the disclosure are directed to methods and/or apparatuses involving a bed. As may be implemented in accordance with one or more embodiments, a pet bed includes a quilt and a shell that is narrower than the quilt and that has upper and lower surfaces connected on sides thereof to form a mattress enclosure. In a first mode, the quilt is housed within the enclosure, utilizing the quilt as a mattress within the enclosure. In a second mode, the quilt is coupled along one or more sides of the shell via one or more fasteners to provide an insulated enclosure having a lower surface defined by the upper surface of the shell and an upper surface defined by the quilt. The quilt extends away from the upper surface of the shell when coupled, therein providing an insulated enclosure opening (e.g., for a pet).

11 Claims, 6 Drawing Sheets

(56) References Cited

U.S. PATENT DOCUMENTS

2021/0392851 A1* 12/2021 Russ .................... A01K 1/0353

OTHER PUBLICATIONS

Ruffwear, Highlands™ Dog Sleeping Bag, https://ruffwear.com/collections/dog-beds/products/highlands-dog-sleeping-bag, © 2021 Ruff wear, downloaded Sep. 1, 2021.
Wilderdog, Sleeping Bag, https://www.wilderdog.com/products/sleeping-bag, © 2021 Wilderdog, downloaded Sep. 1, 2021.
Whyld River, Whyld River's Original Sleeping Bag, https://whyld-river.com/collections/sleeping-bags/products/whyld-rivers-doggybag, downloaded Sep. 1, 2021.

* cited by examiner

CONVERTIBLE BED

OVERVIEW

Aspects of the present disclosure are directed to a convertible bed, which may be utilized for pets.

Various pet beds are utilized for a variety of different pets, such as dogs and cats. Such beds often have a cushioned material, with an open top. This allows easy access and use by pets, of a variety of sizes. Certain bedding for pets utilize a bag-type enclosure, akin to a sleeping bag.

While useful, such pet beds and sleeping bags may be limited in their application, and subject to portability issues. These and other matters have presented challenges to the manufacture and implementation of pet beds, for a variety of applications.

SUMMARY

Various example embodiments are directed to bed related apparatuses and methods, which may address various challenges including those noted above.

As may be implemented in accordance with one or more embodiments, an apparatus includes a quilt having a length, a width, and a plurality of fasteners, and a shell also having a plurality of fasteners. The shell has upper and lower surfaces connected on sides thereof to form a mattress enclosure, and a width that is narrower than the width of the quilt. The shell is configured and arranged with the quilt to operate in a first (bed) mode in which the quilt is housed within the enclosure, therein utilizing the quilt as a mattress within the enclosure for a pet lying on the upper surface of the shell. The shell is further configured and arranged with the quilt to operate in a second (quilt) mode, in which the quilt is coupled along at least one side of the upper surface of the shell via the respective fasteners of the shell and quilt to provide an insulated enclosure. The insulated enclosure has a lower surface defined by the upper surface of the shell and an upper surface defined by the quilt. The wider quilt is configured to extend away from the upper surface of the shell when coupled thereto, therein providing an insulated enclosure opening to facilitate acceptance of a pet lying within the insulated enclosure.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 1A-1C show a pet bed apparatus as may be implemented in accordance with various embodiments, in which:

FIGS. 4A-4C show a pet bed apparatus as may be implemented in accordance with one or more embodiments, in which:

FIGS. 5A-5B show a pet bed apparatus as may be implemented in accordance with one or more embodiments, in which:

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving beds, such as those usable for pets. Various aspects of the present disclosure have been shown to be beneficial when used in the context of pet beds operable in two modes, as a bed and as covered bed. In a particular embodiment, a pet bed includes a quilt and a bed base that operate in an uncovered mode in which the quilt is secured inside the bed base, and in a covered mode in which the quilt is secured to an edge of the bed and extendable upwardly to form a covered sleeping bed on/over the bed base. Such approaches may provide a light-weight, transportable, sleeping system or resting place for dogs and other pets, and may be useful for outdoor activities such as camping or backpacking.

In accordance with various embodiments, a bed apparatus for dogs or other pets includes a soft, outer shell (bed shell/base) and top quilt that acts as both as an inner bed mattress and as a top quilt to keep an animal warm. The outer shell and top quilt may be detachable from one another, or may have a fixed component (e.g., an edge of the quilt may be attached to the outer shell). The quilt may be filled with synthetic or natural down material, as may be light weight and compressible. The bed shell may also include such filling. The bed shell may include an access panel having an opening closeable with a zipper or other component, for insertion of the quilt. The bed shell may further include sleeping pad attachments. The convertible top quilt may be sufficiently greater in both length and width than the bed shell in order to accommodate pet height and girth, as well as movement while sleeping. The apparatus may be used in respective modes as follows:

1) Bed mode: top quilt is inside the bed shell and acts like an inner bed mattress.
2) Quilt mode: top quilt is outside the bed shell and attached to at least one side of bed shell.

In some implementations, the apparatus includes an attached stuff pocket for operation in a third transport mode, in which the top quilt and bed shell are stuffed into the stuff pocket for transport.

Beds as characterized herein may be implemented in one or more of a variety of manners, and may employ one or more of a variety of accessories. In some embodiments, a bed shell includes a sleeping pad attachment (or attachments) on the bottom of the shell configured to couple additional foam, air or other padding. A bed may have loop handles (e.g., on a side) to allow for easy grasping and, for example, shaking of the bed to shed of pet hair or other particulates, and facilitate hanging the bed to dry.

The outer material of bed shells and/or quilts as characterized herein may be made of one or more of a variety of materials. For instance, durable fiber material such as nylon that is resistant to ripping or tearing may be used. Materials may be water resistant or waterproof, washable, synthetic or natural.

In accordance with a particular embodiment, a pet bed includes a quilt and a shell, with the quilt having a length and/or width that is greater than that of the shell. The shell has upper and lower surfaces connected on sides thereof to form a mattress enclosure, for example as may include an opening to accept the quilt for stuffing therein. The lower surface of the shell may include one or more fasteners configured to couple to a pad. The fasteners may include adjustable straps configured to strap around the pad and therein secure the pad to the lower surface of the shell. The shell and quilt may be coupled on one or more sides, and may be detachable. The quilt may have baffles to provide structural support and facilitate insulation. In a particular embodiment, the apparatus includes a pocket coupled to the shell that accepts the shell and the quilt stuffed therein, facilitating transport.

The shell and quilt may operate in a first (bed) mode in which the quilt is housed within the enclosure, utilizing the quilt as a mattress within the enclosure for a pet lying on the upper surface of the shell. In a second (quilt) mode, the quilt may be coupled along one or more sides of the upper surface of the shell via one or more fasteners to provide an insulated enclosure. In the quilt mode, the insulated enclosure has a lower surface defined by the upper surface of the shell and an upper (inside) surface defined by the quilt. The wider quilt thus extends away from the upper surface of the shell when coupled, providing an insulated enclosure for a pet.

The pet bed may be implemented in a variety of manners. The opening of the shell may be closeable, for example with a fastener such as a zipper, button or hook-and-loop fastener. This may seal the quilt within the mattress enclosure. The length and width of the quilt may be longer and wider (e.g., up to 50% longer and/or wider) than the length and width of the shell, facilitating elevation of a central area of the quilt relative to the shell while the quilt is coupled to one or both opposing sides of the shell. The shell may have carry handles to facilitate carrying of the pet bed.

In a particular embodiment, the shell has an access opening extending along one of the sides and being configured to accept the quilt into the enclosure. The quilt is coupled to an interior surface of the shell along the access opening and has uncoupled portions configured to be pulled through the access opening and extended over the upper surface. The fasteners may respectively be coupled to a far side of the upper surface and a far side of the quilt that is extended over the upper surface, and are configured to couple the respective far sides to one another. The quilt may also be detachable, for example for washing and/or drying.

Figure 1A:
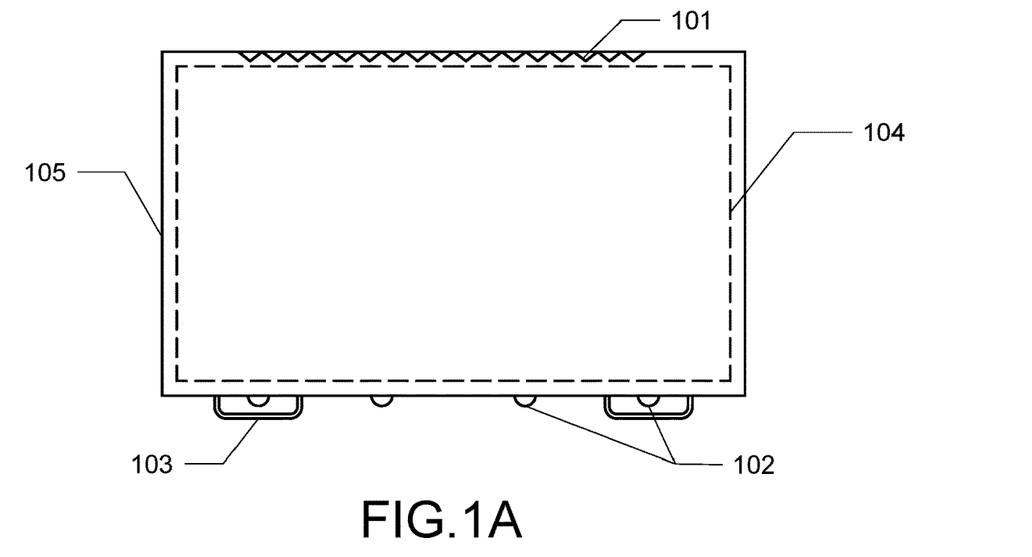
FIG. 1A shows a top view.
Figure 1B:
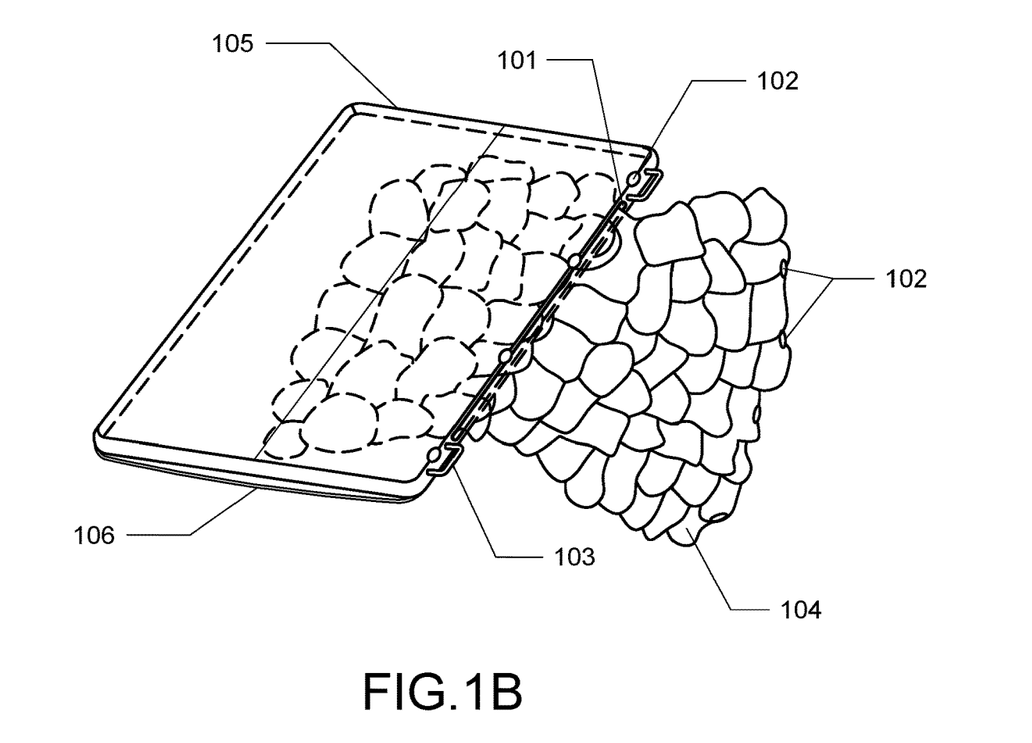
FIG. 1B shows a perspective view with a bed base and covering material partially removed therefrom.
Figure 1C:
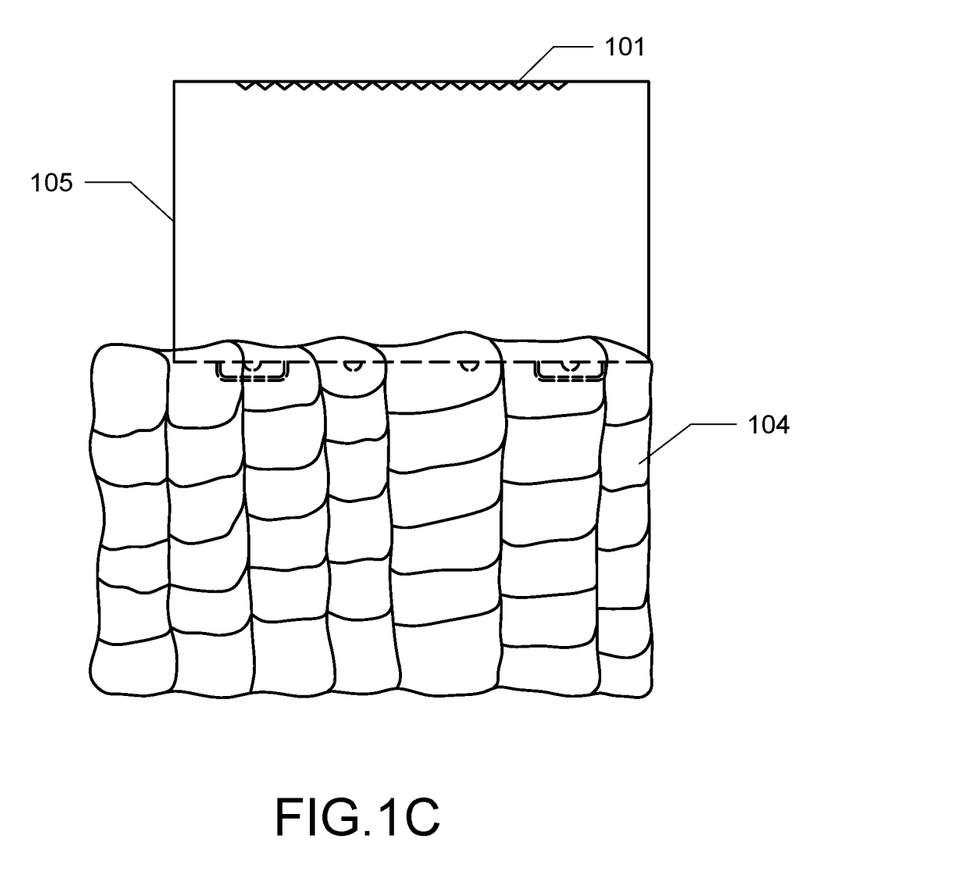
FIG. 1C shows a top view with the covering material coupled to an edge of the base.

Turning now to the figures, FIG. 1 shows FIGS. 1A-1C show a pet bed apparatus as may be implemented in accordance with various embodiments, in which FIG. 1A shows a top view, FIG. 1B shows a perspective view with a bed base and covering material partially removed therefrom, and FIG. 1C shows a top view with the covering material coupled to an edge of the base. The apparatus includes a shell enclosure 105 having an opening 101, with optional fasteners 102 and optional handles 103. A quilt 104 is shown stored within the shell enclosure 105, and may include additional fasteners 102. The opening 101 may include a zipper or other closure type component. As shown in FIG. 1B, the quilt 104 may be pulled out of the shell enclosure 105 through the opening 101, and further coupled to the shell enclosure 105 via the fasteners 102 as shown in FIG. 1C. The apparatus may further include a pad type structure that may be coupled to an underside of the shell enclosure 105 via straps 106, providing additional support for example to a pet lying on the shell enclosure 105 without the quilt 104 therein.

Figure 2:
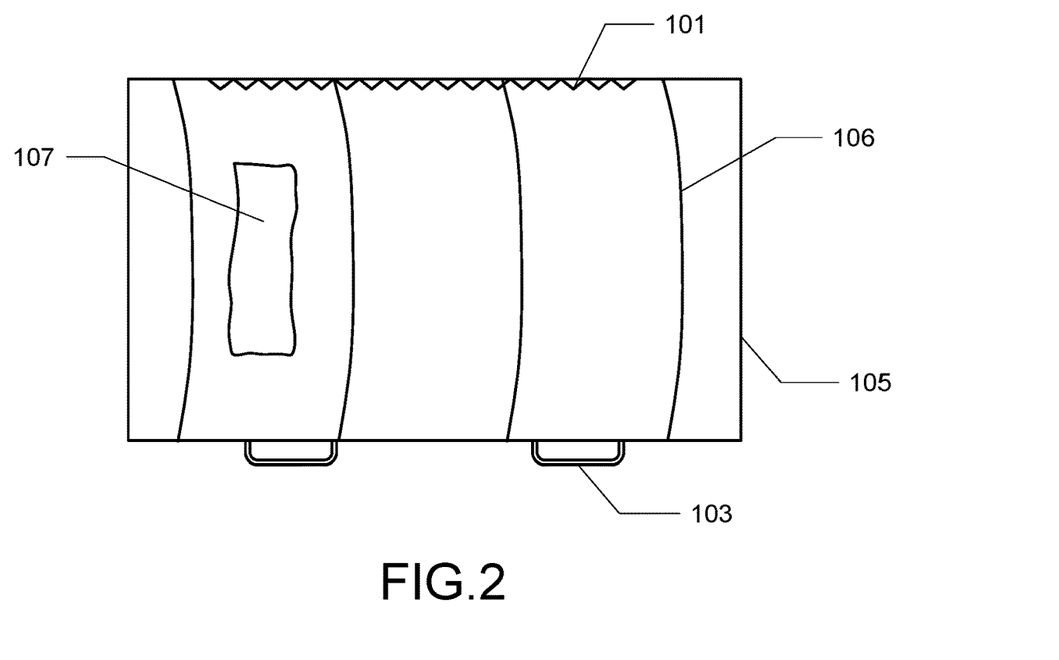
FIG. 2 shows a pet bed apparatus as may be implemented in accordance with one or more embodiments.

FIG. 2 shows a pet bed apparatus as may be implemented in accordance with one or more embodiments. For example, the apparatus in FIG. 2 may be implemented in connection with the apparatus shown in FIGS. 1A-1C, as a bottom view. Accordingly, similar numbers are utilized to refer to similar components. A shell enclosure 105 has an opening 101 for accepting a quilt, handles 103, straps 106 (e.g., for coupling to a pad) and a stuff pocket 107 that may be utilized for stuffing the shell enclosure (and, e.g., quilt) therein.

Figure 3:
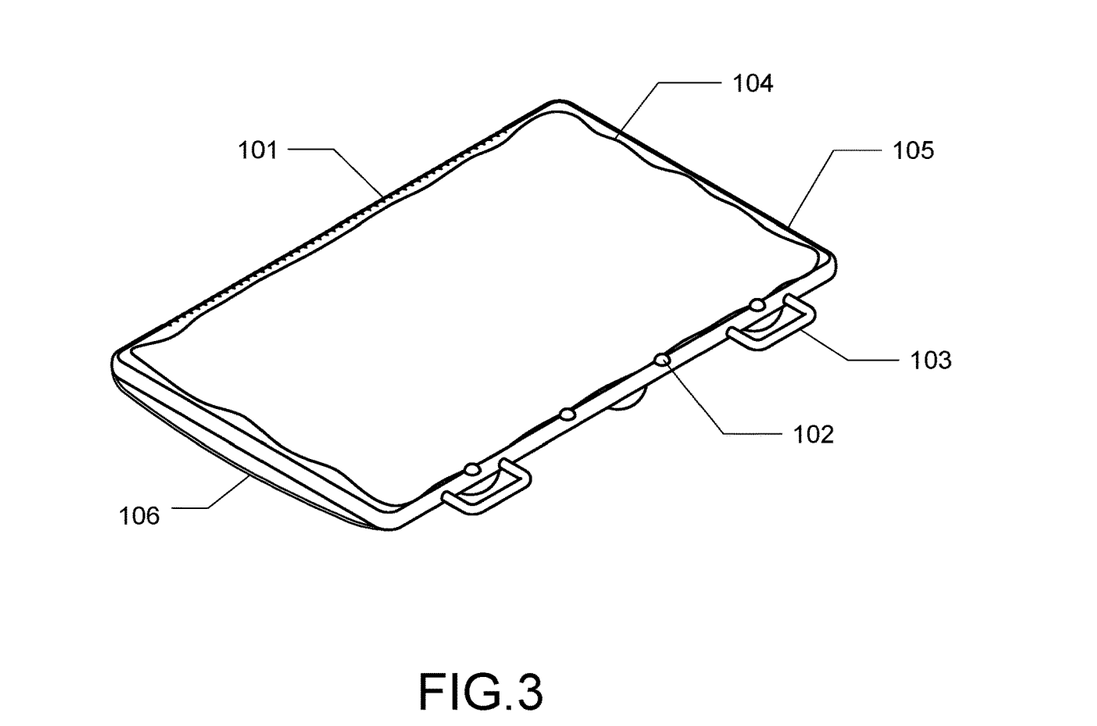
FIG. 3 shows a perspective view of pet bed apparatus as may be implemented in accordance with one or more embodiments.
Figure 4A:
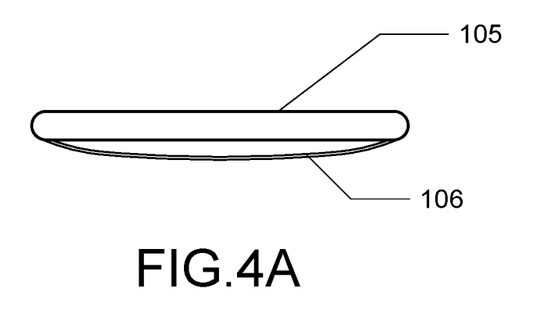
FIG. 4A shows a front view.
Figure 4B:
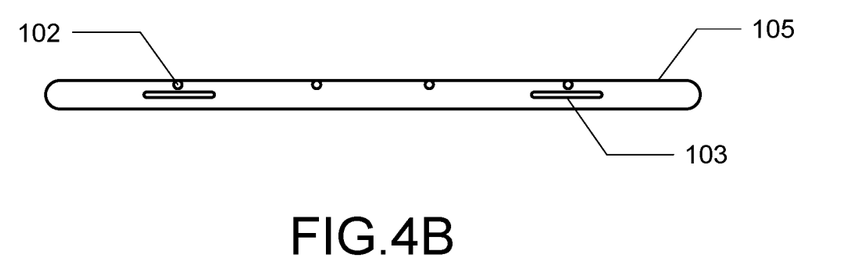
FIG. 4B shows a side view.
Figure 4C:
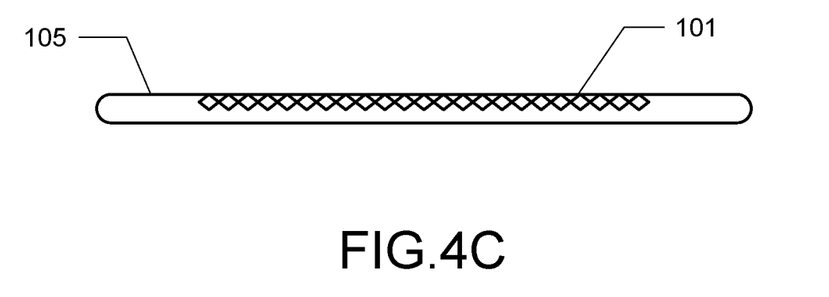
FIG. 4C shows an opposing side view.

FIG. 3 shows a perspective view of pet bed apparatus as may be implemented in accordance with one or more embodiments, including with that shown in FIGS. 1A-1C and in FIG. 2, in a quilt mode as characterized herein. A quilt 104 is on a shell enclosure 105 that may have an opening 101, handles 103 and straps 106. Fasteners 102 couple the quilt to the shell enclosure FIGS. 4A-4C show a pet bed apparatus as may be implemented in accordance with one or more embodiments, in which FIG. 4A shows a front view, FIG. 4B shows a side view, and FIG. 4C shows an opposing side view. As with the above the apparatus may be implemented using one or more aspects depicted in FIGS. 1A-1C, FIG. 2 and/or FIG. 3. A shell enclosure 105 has bottom straps 106, handles 103, fasteners 102, and an opening 101. In some embodiments, one or more additional fasteners are located near the opening as depicted in FIG. 4C, on an opposing side relative to the fasteners shown in FIG. 4B.

Figure 5A:
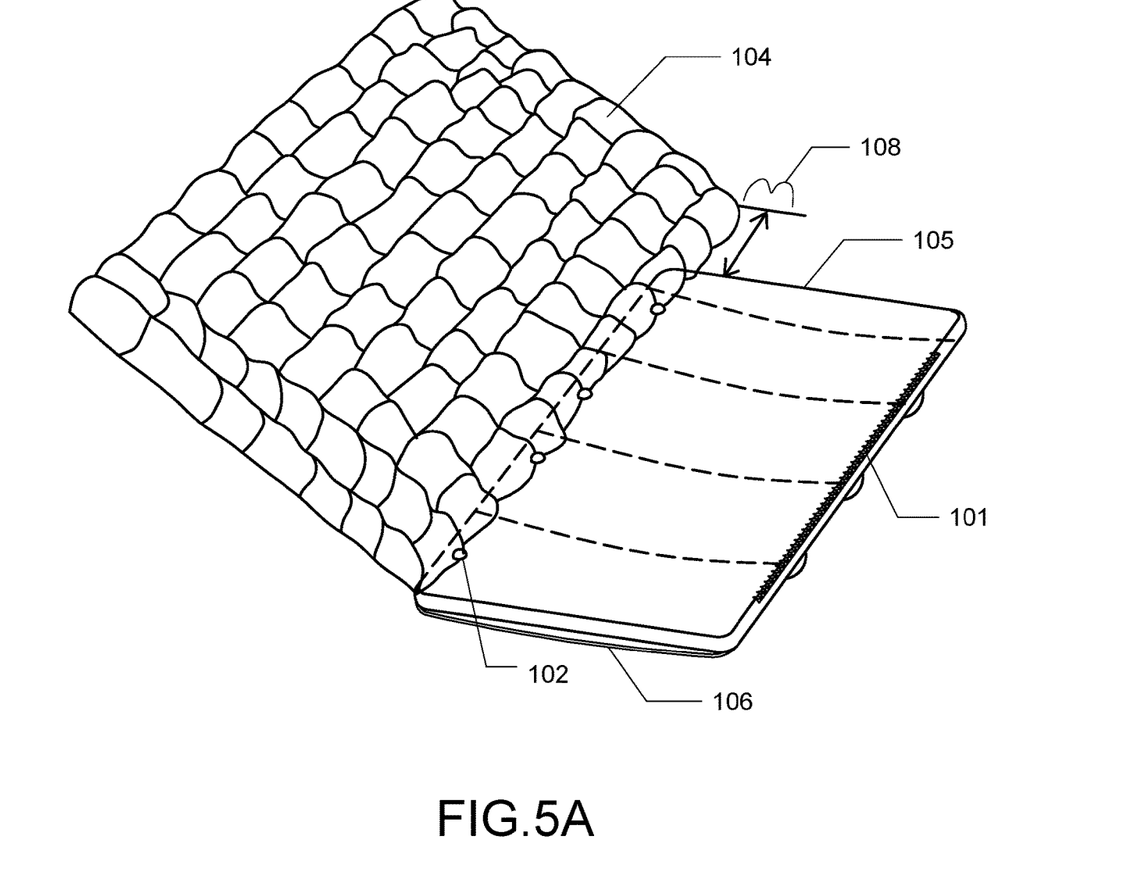
FIG. 5A shows a base with a cover attached to one side thereof.
Figure 5B:
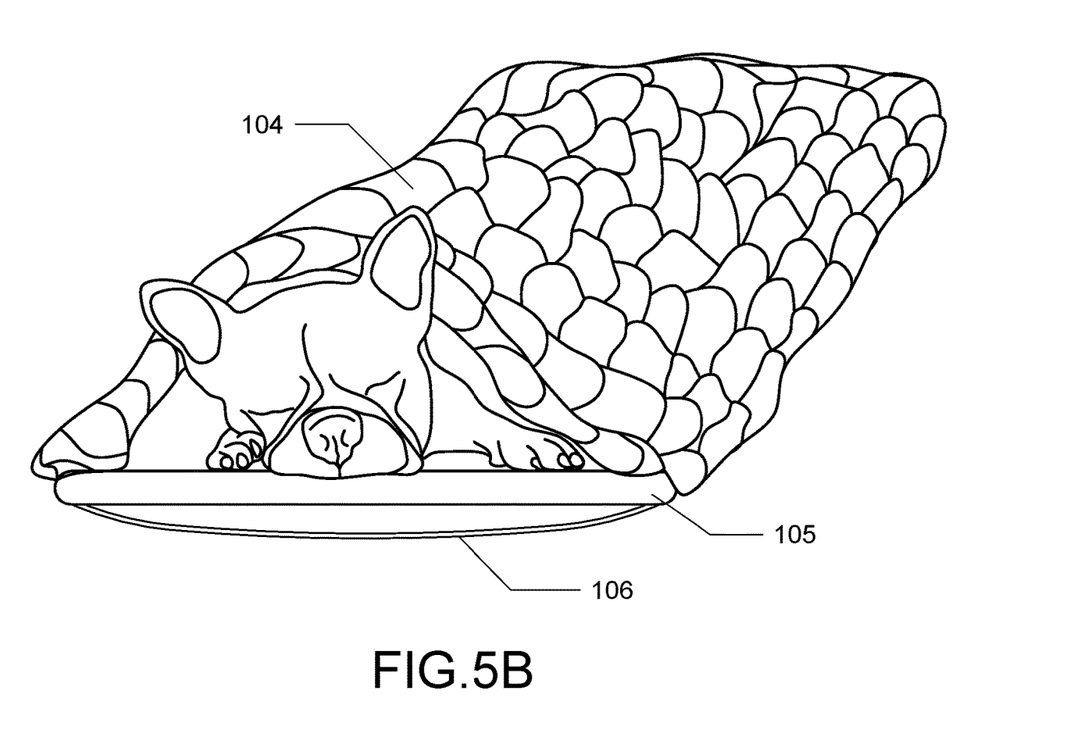
FIG. 5B shows the base with the cover attached to both sides thereof, and a pet on the base and under the cover.

FIGS. 5A-5B show a pet bed apparatus as may be implemented in accordance with one or more embodiments, in which FIG. 5A shows a base with a cover attached to one side thereof, and FIG. 5B shows the base with the cover attached to both sides thereof, and a pet on the base and under the cover. The apparatus as shown may, for example be implemented in accordance with one or more of the other figures.

Referring to FIG. 5A, a quilt 104 is shown coupled to a shell enclosure 105 by fasteners 102, with the quilt 104 having a length that is longer than the shell enclosure 105 as depicted at 108. The shell enclosure has an opening 101 for accepting the quilt 104 or other material therein, such as a pad or other cushion material. Straps 106 may be provided for coupling a pad or other material as well. The width of the quilt 104 is also wider than that of the shell enclosure 105, such that it may extend over a pet as depicted in FIG. 5B.

In some implementations, the additional fasteners may be located along a lower edge of the shell enclosure (near strap 106) and/or along an edge opposing that where the fasteners 102 are shown (near opening 101). This may thus leave an on opening on the opposing end for accepting a pet therein a shown while securing the quilt on three sides. The greater length/width of the quilt 104 thus facilitates positioning of a center region of the quilt away from the shell enclosure for forming an enclosed sleeping space for the pet.

Based upon the above discussion and illustrations, those skilled in the art will readily recognize that various modifications and changes may be made to the various embodiments without strictly following the exemplary embodiments and applications illustrated and described herein. For example, a variety of different types of materials may be utilized, and a variety of types of fasteners may be utilized. In addition, the quilts as characterized herein may be coupled in different locations than that shown to an underlying shell. Such modifications do not depart from the scope of various aspects of the invention, including aspects set forth in the claims.

What is claimed is:

1. A pet bed comprising:
   a quilt having a length, a width that is narrower than the length with first and second opposing edge sides of the quilt extending along the length of the quilt, and a plurality of fasteners;
   a shell having a length, a width that is narrower than the length of the shell and narrower than the width of the quilt, and a plurality of fasteners along opposing edges along the length of the shell and configured to selectively couple to and disconnect from the plurality of fasteners of the quilt, the shell having upper and lower surfaces connected along the edges thereof at opposing sides of the shell that extend along the length thereof to form an enclosure, the shell having an opening along one of the opposing sides, the shell being configured and arranged with the quilt to:
   in a first mode, house the quilt within the enclosure with the shell extending over the quilt and the first edge side of the quilt being anchored along an edge of the one side of the opposing sides of the enclosure and the second edge side of the quilt extending freely into the enclosure via the opening, therein utilizing the quilt as a mattress within the enclosure for a pet lying on the upper surface of the shell; and
   in a second mode, anchor the first edge side of the quilt along said edge of the one side of the opposing sides of the enclosure and couple the second edge side of the quilt to an edge of the opposing side of the upper surface of the shell via the respective fasteners of the shell and the quilt to provide an insulated enclosure having an opening at an end of the shell that extends along the width of the shell, between the opposing sides and for accepting a pet, the insulated enclosure having a lower surface defined by the upper surface of the shell and an upper surface defined by the quilt, the quilt being wider and configured to extend away from the upper surface of the shell when coupled thereto, therein providing the insulated enclosure opening to facilitate acceptance of a pet within the insulated enclosure through the end and lying on the upper surface of the shell with the quilt covering and insulating the pet.

2. The pet bed of claim 1, wherein the opening includes a closeable opening configured to seal the quilt within the enclosure upon closure.

3. The pet bed of claim 1, wherein the length of the quilt is longer than the length of the shell, therein further facilitating acceptance of the pet lying within the enclosure.

4. The pet bed of claim 3, wherein the length and the width of the quilt are longer and wider than the length and width of the shell, facilitating elevation of a central area of the quilt relative to the shell while the quilt is coupled to opposing sides of the shell.

5. The pet bed of claim 1, further including fasteners coupled to the lower surface of the shell and configured to couple to a pad.

6. The pet bed of claim 5, wherein the fasteners coupled to the lower surface of the shell include adjustable straps configured to strap around the pad and therein secure the pad to the lower surface of the shell.

7. The pet bed of claim 1, further including carry handles attached to the shell and configured to facilitate carrying of the pet bed.

8. The pet bed of claim 1, wherein the shell and quilt are detachable from one another.

9. The pet bed of claim 1, wherein:
   the quilt is coupled to an interior surface of the shell along the access-opening along the one of the opposing sides of the shell and has uncoupled portions configured to be pulled through the opening and extended over the upper surface.

10. The pet bed of claim 1, wherein the quilt has baffles to provide structural support and facilitate insulation.

11. The pet bed of claim 1, further including a pocket coupled to the shell, the pocket being configured and arranged to facilitate transportation of the pet bed by accepting the shell and the quilt stuffed therein.

* * * * *